US012563610B2

(12) United States Patent
Arngren et al.

(10) Patent No.: US 12,563,610 B2
(45) Date of Patent: Feb. 24, 2026

(54) METHOD AND COMMUNICATION DEVICES FOR ESTABLISHING A CONNECTION AND FOR EXCHANGING INFORMATION BETWEEN THE COMMUNICATION DEVICES OVER THE ESTABLISHED CONNECTION

(71) Applicant: Telefonaktiebolaget LM Ericsson (publ), Stockholm (SE)

(72) Inventors: Tommy Arngren, Södra Sunderbyn (SE); Daniel Bergström, Luleå (SE); Andreas Kristensson, Södra Sandby (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 595 days.

(21) Appl. No.: 17/927,913

(22) PCT Filed: May 29, 2020

(86) PCT No.: PCT/EP2020/065003
§ 371 (c)(1),
(2) Date: Nov. 28, 2022

(87) PCT Pub. No.: WO2021/239252
PCT Pub. Date: Dec. 2, 2021

(65) Prior Publication Data
US 2023/0328804 A1     Oct. 12, 2023

(51) Int. Cl.
*H04W 76/10*     (2018.01)
*H04W 8/24*     (2009.01)

(52) U.S. Cl.
CPC ............. *H04W 76/10* (2018.02); *H04W 8/24* (2013.01)

(58) Field of Classification Search
CPC ....... H04W 8/24; H04W 12/02; H04W 76/10; H04W 76/19
See application file for complete search history.

(56) References Cited

U.S. PATENT DOCUMENTS

2020/0074064 A1*  3/2020  Chen ........................ G06F 21/34
2020/0097123 A1*  3/2020  Srinivasan ............ G06F 3/0418

FOREIGN PATENT DOCUMENTS

CN       107135471 A      9/2017
EP         3564839 A1     11/2019
WO      2017090820 A1     6/2017

OTHER PUBLICATIONS

International Search Report and Written Opinion of the International Searching Authority, PCT/EP2020/065003, mailed Feb. 10, 2021, 10 pages.

(Continued)

*Primary Examiner* — Bo Hui A Zhu
(74) *Attorney, Agent, or Firm* — Sage Patent Group

(57) ABSTRACT

A method for providing information exchange between a primary communication device and a secondary communication device, where the method, when executed in the primary communication device, comprises: determining that functionality of the primary communication device is malfunctioning; recognizing at least one indication, each being received from a secondary communication device, indicating that the respective secondary communication device is capable of providing substitute functionality for the malfunctioning functionality; setting up a connection between the primary and the secondary communication device, and executing a command, received from the substitute functionality of the secondary communication device.

19 Claims, 8 Drawing Sheets

(56)         References Cited

OTHER PUBLICATIONS

"How to use your broken smartphone from a PC", Rahul Srinivas, nextpit.com, Feb. 2022, 17 pages.
"The Remote Framebuffer Protocol", T. Richardson and J. Levine, Internet Engineering Task Force (IETF), RealVNC Ltd., Mar. 2011, 39 pages.
"Virtual Network Computing", Wikipedia, Nov. 5, 2022, 5 pages.

* cited by examiner

110a

120a

110b

120b

130

METHOD AND COMMUNICATION DEVICES FOR ESTABLISHING A CONNECTION AND FOR EXCHANGING INFORMATION BETWEEN THE COMMUNICATION DEVICES OVER THE ESTABLISHED CONNECTION

CROSS REFERENCE TO RELATED APPLICATIONS

This application is a 35 U.S.C. § 371 national stage application of PCT International Application No. PCT/EP2020/065003 filed on May 29, 2020, the disclosure and content of which is incorporated by reference herein in its entirety.

TECHNICAL FIELD

Communication devices adapted for and a method for establishing a connection between two communication devices and for exchanging data between the two communication devices over the established connection.

BACKGROUND

Today, significant parts of a person's life is stored in that person's mobile phone or device. As a consequence, the mobile phone will typically hold sensitive and personal information that can be very cumbersome to restore in case relevant functionality of the device is broken or malfunctioning, e.g. due to that it has been dropped in such an unfortunate way that the screen has broken, thereby making it unusable. There are different alternatives available today for allowing restoration of data from a mobile phone, where one possible alternative involves use of a Personal Computer (PC) for restoration of relevant data, accessible from the cloud. However, when applying such an approach, many hardware-near repairs & maintenance activities may call for a re-installation of the operating system of the mobile phone, with the associated risk of losing data. Given this risk, the user is often prone to offload any important/critical content from the mobile phone to a cloud solution, which typically may be challenging with respect to the upcoming steps, given that the user may be requested to acknowledge a new external hardware, connectable by tapping on the screen of the mobile device. However, in the situation where the screen of the mobile device is broken and not operable, the malfunctioning screen will be the root cause for the required activity, and, thus, we will end up in a catch 22 situation, where data cannot be accessed from the malfunctioning communication device.

According to one approach one computer may control another, remote computer e.g. via Virtual Network Controller (VNC). VNC uses the Remote Frame Buffer (RFB) protocol, IETF RFC6143, to transmit screen pixel data from one computer to the other over an available network, where control events are sent in return. For enabling this a VNC Server app will be required at the remote computer that you want to control, whereas an associated VNC Viewer app will be required at the computer from which you want to control the remote computer. These apps can be downloaded in advance and run on-demand. The VNC Server app captures the desktop of the controlled computer in real-time, which is sent to the VNC Viewer app for display. The VNC Viewer app gathers input from e.g. a mouse, keyboard or touch pad and sends this input to the VNC Server app to inject, and actually achieve, remote control of the other computer.

When two computers, acting as a respective VNC client and server, first connect, as suggested above, e.g. by using the RFB protocol, they exchange a sequence of handshake messages that determine which protocol version to apply, what type of connection security (if any) to use, and also executes a password check, if the security type so requires.

However, existing solutions, such as e.g. the one suggested above, does not support any means or mechanism for providing access to data of a device where functionality which is normally needed for executing the mentioned mechanism, such as e.g. the screen, is broken or malfunctioning. More specifically, existing solutions requires a fully operating User Interface (UI) for establishing connectivity and data exchange between two devices. It may be sufficient that a part of the functionality required for a UI interaction is malfunctioning for making data access and exchange impossible, thereby standing the risk of losing important data.

SUMMARY OF INVENTION

It is an aim of the present disclosure to provide a method, communication devices and corresponding computer readable medium which at least partially address the challenges discussed above.

According to one aspect a method for providing information exchange between a primary communication device and a secondary communication device is suggested where the method, when executed in the primary communication device, determine that functionality of the primary communication device is malfunctioning and recognize at least one indication of capability, where each such indication is received from a secondary communication device, indicating that the respective secondary communication device is capable of providing substitute functionality for the malfunctioning functionality. A connection is set up between the primary and the secondary communication device, and a command, received from the substitute functionality of the secondary communication device, is executed.

According to another aspect, a method for providing information exchange between a primary communication device and a secondary communication device is suggested where the method, when executed in the secondary communication device, transmits an indication of capability to the primary communication device, offering substitute functionality, substituting malfunctioning functionality of the primary communication device and participates in a connection set-up between the primary communication device and the secondary communication device, in response to receiving an indication of an initiated connection set-up from the primary communication device after which a command, associated with the substitute functionality of secondary communication device, is recognized and the recognized command is transmitted to the primary communication device.

According to yet another aspect, a primary communication device, capable of exchanging information with a secondary communication device is suggested, where the primary communication device is configured to determine that functionality of the primary communication device is malfunctioning and recognize at least one indication of capability, where each such indication is being received from a secondary communication device), indicating that the respective secondary communication is capable of providing substitute functionality for the malfunctioning functionality. A connection is set-up between the primary and the secondary communication device, and a command, received from the substitute functionality of the secondary communication device is executed.

According to another aspect, a primary communication device, capable of exchanging information with a secondary communication device is suggested, where the primary communication device comprise processing circuitry, comprising one or more processors, connected to a memory, storing computer readable instructions that, when executed by the processing circuitry causes the primary communication device to: determine that functionality of the primary communication device is malfunctioning and recognize at least one indication of capability, each being received from a secondary communication device, indicating that the respective secondary communication device is capable of providing substitute functionality for the malfunctioning functionality. The second communication device is also caused to set-up a connection between the primary and the secondary communication device, and to execute a command, received from the substitute functionality of the secondary communication device.

According to another aspect, a computer program for exchanging information between a primary communication device and a secondary communication device is suggested, where the computer program comprise computer readable code which, when run on processing circuitry of the primary communication device, causes the primary communication device, to determine that functionality of the primary communication device is malfunctioning and to recognize at least one indication of capability, each being received from a secondary communication device, indicating that the respective secondary communication device is capable of providing substitute functionality for the malfunctioning functionality. The primary communication device is also caused to set-up a connection between the primary and the secondary communication device, and to execute a command, received from the substitute functionality of the secondary communication device.

According to yet another aspect, a secondary communication device, capable of exchanging information with a primary communication device is suggested, where the secondary communication device is configured to transmit an indication of capability to the primary communication device, offering substitute functionality, substituting malfunctioning functionality of the primary communication device and to participate in a connection set-up between the primary communication device and the secondary communication device, in response to receiving an indication of an initiated connection set-up from the primary communication device. The secondary communication device is also configured to recognize a command, associated with the substitute functionality of secondary communication device, and to transmit the recognized command to the primary communication device.

According to another aspect, a secondary communication device, capable of exchanging information with a primary communication device is suggested, where the primary communication device comprise processing circuitry, comprising one or more processors, connected to a memory, storing computer readable instructions that, when executed by the processing circuitry causes the secondary communication device to transmit an indication of capability to the primary communication device, offering substitute functionality, substituting malfunctioning functionality of the primary communication device and to participate in a connection set-up between the primary communication device and the secondary communication device, in response to receiving an indication of an initiated connection set-up from the primary communication device. The secondary communication device is also configured to recognize a command, associated with the substitute functionality of secondary communication device and to transmit the recognized command to the primary communication device.

According to yet another embodiment, a computer program for exchanging information between a primary communication device and a secondary communication device is suggested, where the computer program comprise computer readable code which, when run on processing circuitry of the secondary communication device, causes the secondary communication device to transmit an indication of capability to the primary communication device, offering substitute functionality, substituting malfunctioning functionality of the primary communication device and to participate in a connection set-up between the primary communication device and the secondary communication device, in response to receiving an indication of an initiated connection set-up from the primary communication device. The secondary communication device is also caused to recognize a command, associated with the substitute functionality of secondary communication device, and to transmit the recognized command to the primary communication device.

BRIEF DESCRIPTION OF THE DRAWINGS

For a better understanding of the present disclosure, and to show more clearly how the technical solution as suggested herein may be carried into effect, reference will now be made, by way of example, to the following drawings in which.

DETAILED DESCRIPTION

In order to be able to perform tasks of a communication device, such as e.g. a smart phone, an Internet of Things (IoT) device, a Machine to Machine (M2M) device, a pad, a wearable device, or any other type of communication device where malfunctioning functionality of the communication device makes certain tasks impossible without further assistance, a mechanism for enabling access to available replacement functionality would be required. A mechanism for enabling connection of the malfunctioning communication device with another communication device, having corresponding stand-in functionality available for the malfunctioning communication device, is therefore suggested. If needed the mechanism also includes a procedure for searching for potential stand-in devices.

The suggested mechanism provides for automated wireless or wired access between a malfunctioning and an assisting, stand-in or substitute device via a suitable access protocol, where all or parts of user interaction required for a data exchange between the two devices can be executed by applying functionality of the stand-in device on behalf of the corresponding malfunctioning functionality of the malfunctioning device. The malfunctioning functionality may typically refer to functionality of a Graphic User Interface (GUI), such as e.g. a touchscreen, or any other type of User Interface (UI), such as e.g. a keyboard, a microphone, a loudspeaker. Alternatively, or in addition malfunctioning functionality may refer to functionality of a pair of Extended Reality (XR) glasses, or any other functionality which, when malfunctioning, prohibits a user to interact with the malfunctioning device.

The suggested solution relies on an application (app) or function configured to execute a method that enables a malfunctioning communication device, hereinafter also referred to as a primary communication device, and another communication device, hereinafter referred to as a secondary communication device, or stand-in device, to establish connection between each other so that the secondary communication device can act as a stand-in device for the primary communication device, at least with respect to the malfunctioning functionality. Typically, the two communication devices are also authorizing each other in order to verify that the secondary communication device is actually allowed to act as a stand-in device for the primary communication device.

After having established contact, the communication devices will be able to execute a more or less automated, predefined data exchange procedure, where a user of the secondary communication device is able to remotely control, or use, still functioning functionality of the malfunctioning, primary communication device.

Figure 1A:
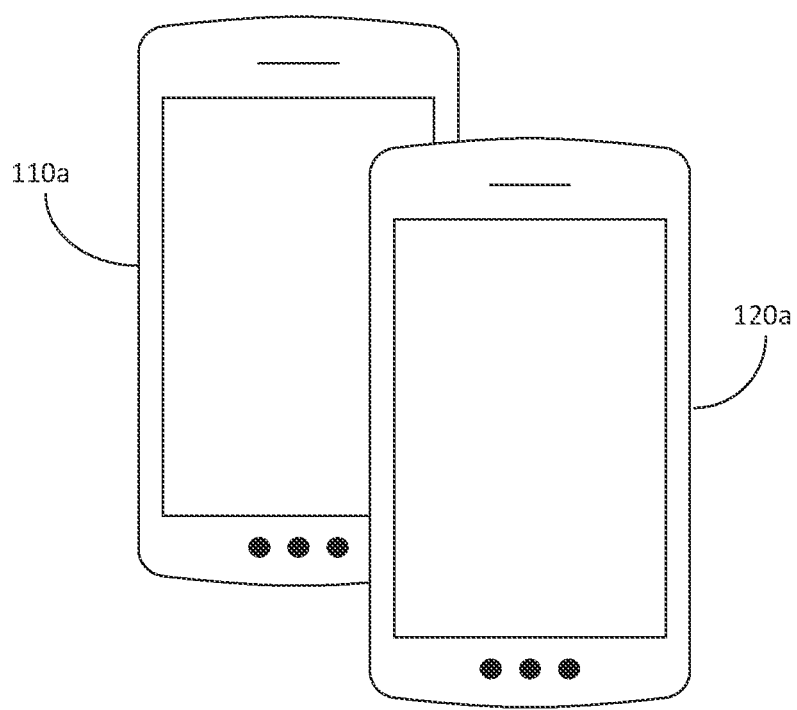
FIG. 1a is illustrating two communication devices, capable of setting up a wireless connection and exchanging data wirelessly via the wireless connection.

FIG. 1a is an illustration of a primary communication device 110a, having malfunctioning functionality and a secondary communication device 120a, capable of acting as a stand-in communication device with respect to the malfunctioning functionality of the primary communication device 110a. The communication devices 110a, 120a of FIG. 1a are capable of exchanging data so that functioning functionality of the primary communication device 110a, can be used in a conventional way due to a user interacting with the functioning functionality via substitute functionality of the secondary communication device 120a.

In the present example, data is exchanged wirelessly between the two communication device 110a, 120a, typically by holding the communication devices 110a, 120a in sufficiently close vicinity of each other for applying a wireless, preferably short-range, communication. Applicable wireless standards may be based e.g. on Near Field Communication (NFC), InfraRed (IR) communication, vibration, sound or light, where communication is applied e.g. via light and camera, vibration, where the two devices are communicating when one device is lying on top of the other, or sound, where communication via speaker and microphone can be applied.

Figure 1B:
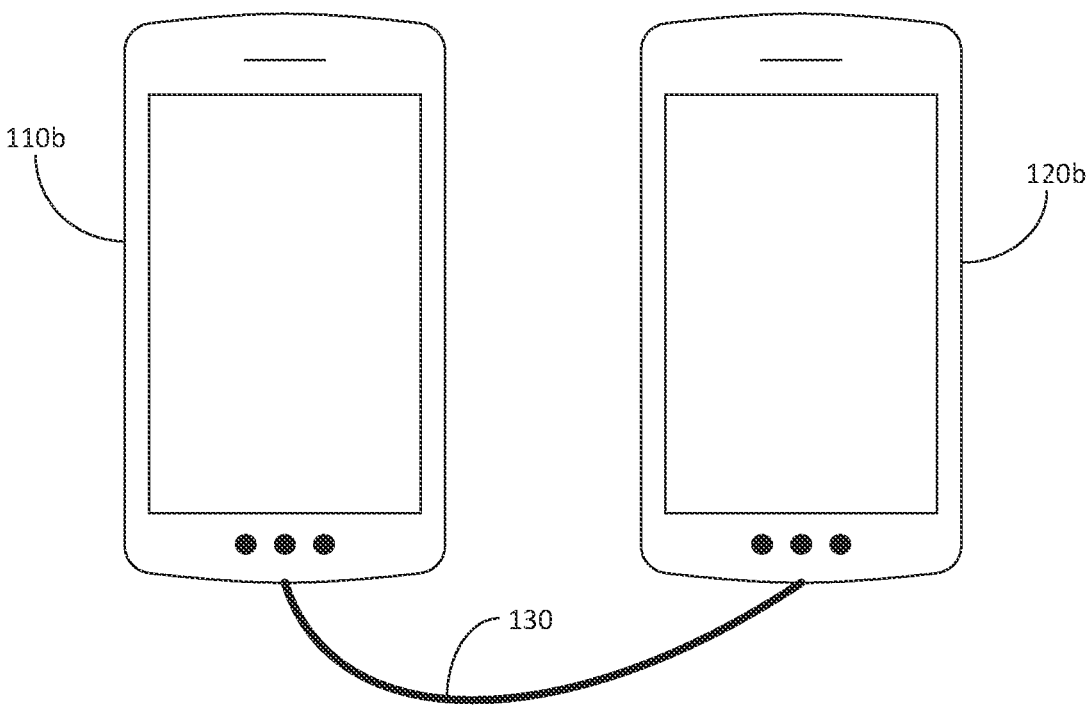
FIG. 1b is illustrating two communication devices, capable of setting up a wired connection and exchanging data via the wired connection.

Alternatively, two wireless devices 110b, 120b may communicate via a wired 130 connection, such as e.g. via a Universal Serial Bus (USB) connection, as indicated in FIG. 1b.

Figure 2:
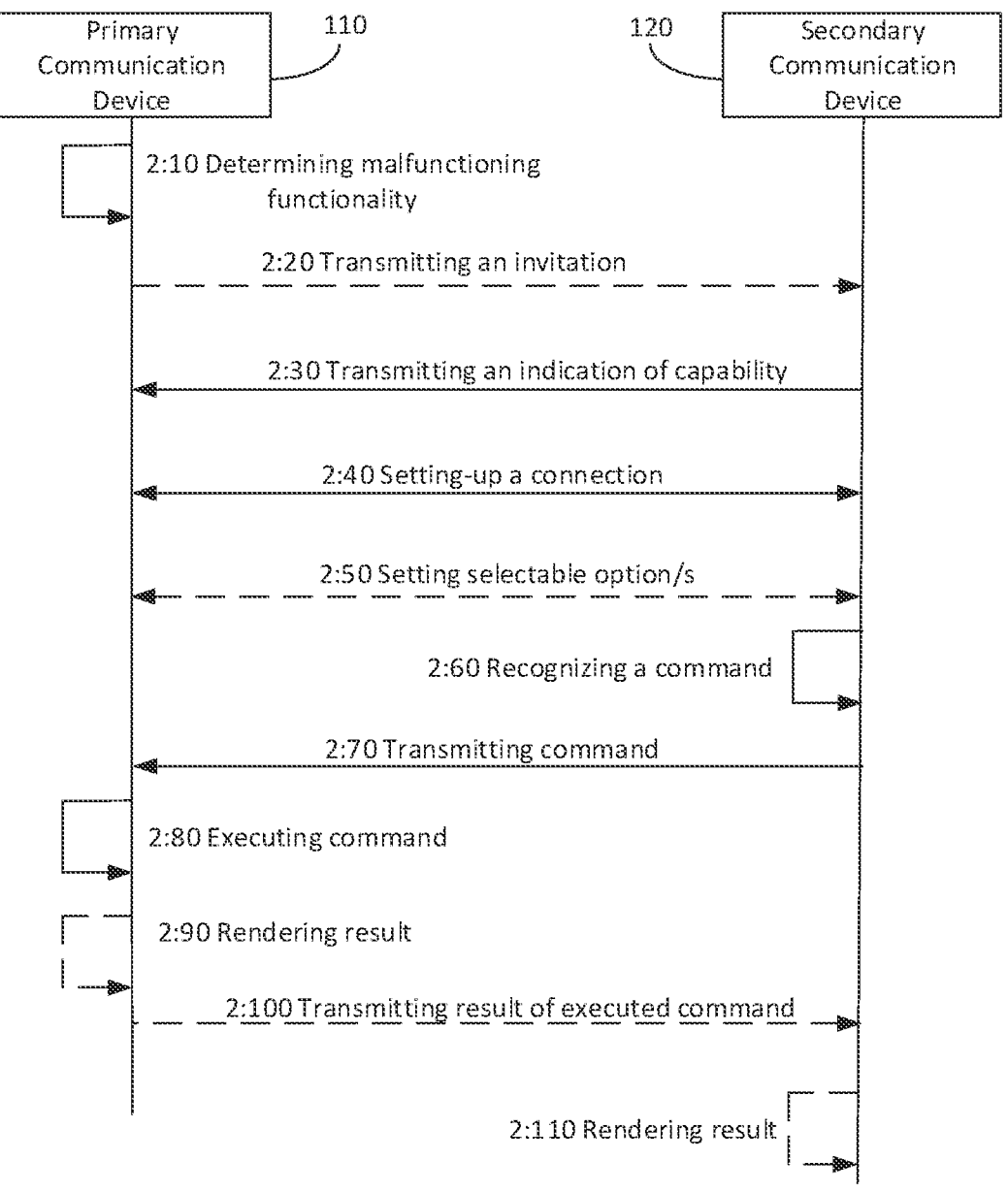
FIG. 2 is a signaling scheme, illustrating how a primary communication device, having malfunctioning functionality, is being assisted by a secondary communication device, acting as a stand-in device.

A procedure for assisting a malfunctioning communication device from another communication device, as suggested above, will now be described in further detail with reference to the signaling scheme of FIG. 2, where, according to step 2:10, a primary communication device 110 is determining that it comprises functionality that is not fully functional, i.e. that, at least to some extent is malfunctioning. The suggested procedure is executed by way of applying a respective app or function, executable on the respective communication device. Such an app or function may have been activated in advance, so that it is e.g. capable of initiating a self-testing procedure when there are indications that functionality of a primary communication device is not operating as expected, or the function or app may be configured to activate in response to that the device is detecting that a specific incident, such as e.g. a fall or other impact against a solid surface, or a misuse of the primary device, such as e.g. exposure of the device to moist, has occurred.

Whereas some of the mentioned embodiments, where an app or function is activated in advance, may be more relevant for a secondary communication device, thereby making such a communication device ready to provide stand-in functionality whenever a demand arises, embodiments, where an app or function is activated when it is found to be needed may be more suitable for a malfunctioning, primary communication device, where e.g. a detectable event may be a trigger for a need for stand-in functionality. Activation of an app or function in each respective device may be executed according to different principles for the different categories of devices, or both devices may apply the same principle.

According to one embodiment activation of an app or function of a device may be activated at a malfunctioning device itself. Execution of functionality, resulting in an error message, due to malfunctioning functionality may e.g. trigger activation of the app or function. According to another embodiment, the respective app or function is activated from another device. An app or function of a malfunctioning communication device may e.g., according to one embodiment, be activated from a stand-in communication device, e.g. by a user having observed that functionality of the secondary communication device is malfunctioning. Alternatively, the app or function of the malfunctioning device may be activated from another external device, such as e.g. a smart watch, or from a central server.

Malfunctioning may in the present context refer to e.g. a display or touch screen that is broken to such an extent that it cannot be used at all, or it can be partly broken, so that one or more parts of it can be used whereas one or more other parts are not usable, thereby prohibiting certain actions to be executed without assistance from a secondary device. Alternatively, functionality may, at a first glance, appear to be working but produce an erroneous result upon executing a specific function, which may become an obstacle for completing a series of user interactions in an expected way.

Malfunctioning functionality may be determined by the primary communication device according to a plurality of alternative ways. According to one embodiment the primary communication device 110 is initiating a monitoring function for monitoring at least a part of the functionality of the primary communication device 110, and, during such monitoring, determining that one or more parts of the monitored functionality is malfunctioning, in case certain functionality cannot be executed in an expected manner by the monitoring functionality. Such a monitoring function may be activated repeatedly at certain pre-determined or scheduled time intervals, or upon detecting that a certain event, such as e.g. intense impact of the device into a solid surface may have occurred. According to one example certain spots of a touch screen, typically evenly distributed on the screen, may be automatically tested in order to determine if these parts of the screen are operable or broken. A simulated sweeping sequence may e.g. be executed automatically at the primary communication device 110. In case the sensed touch pattern shows anomalies, this may be construed as an indication of a malfunctioning part of the touchscreen. Anomalies may include detection of a malfunctioning display functionality, malfunctioning touch functionality or a combination of both.

Alternatively, a user of a primary communication device 110 may be instructed to manually perform certain tests for determining if the primary device 110 comprise malfunctioning functionality or not. A user may e.g. be instructed to sweep along a GUI, such as e.g. a touchscreen in a pattern which roughly cover the whole area of the screen, where instructions may be provided via the GUI or via a UI other than the mentioned GUI, such as e.g. via voice instructions.

A test of functionality may be executed by recognizing a user input addressing certain functionality of the primary communication device 110, at the primary communication device 110 and starting a timer. In case no response to the request has been recognized upon time-out of the timer, it is determined, by the primary communication device 110, that at least a part of the functionality of the primary communication device 110 is malfunctioning. The latter embodiment may e.g. involve that a user is requested to perform a certain action on the device, or the user may perform the action of his own volition. If no expected response has been recognized at the primary communication device 110 upon timeout of the timer, it can be expected that it is not possible to perform the requested action in a correct and expected way, due to malfunctioning functionality.

According to another embodiment the determining of malfunctioning functionality may be based on that a predetermined user interaction, executed on certain, operable functionality of the primary communication device 110 according to a predetermined pattern, is recognized, where such a user interaction is interpreted as indicating a certain malfunctioning functionality. The latter embodiment may typically be applicable when a user has determined that a specific functionality is malfunctioning and wants to provide this information to the primary device via operable functionality of that device, i.e. in situations where the determination of malfunctioning can be executed manually, without requiring any monitoring or tests.

According to a further embodiment, malfunctioning functionality is determined by the primary communication device 110 by recognizing an indication, indicating that substitute functionality is required for the primary communication device 110, where the indication is received from the secondary device. In the latter scenario, predefined testing routines may be activated for testing the functioning of specific functionality, or the indication may be trusted without requiring any testing. A user of a secondary communication device may e.g. have witnessed how a touch screen of the primary communication device 110 breaks due to a fall against a hard surface, and determines, e.g. by trying to manually execute a certain action on the broken touch screen, that certain functionality, in this case the whole or a certain part of the touch screen of the primary communication device 110 is not working properly. In the latter scenario, the determining step 2:10 may need to be executed later in the suggested process, such that a trusted connection is initially set-up, as will be explained in further detail below, after which the determining is executed e.g. based on input from a secondary communication device.

The determining process suggested above may alternatively be executed at the primary communication device by activating certain hardware of the device, or compatible with the device. By way of example a user may plug and unplug a charger e.g. three times in quick succession into a socket of the primary communication device, thereby signaling to the primary communication device that functionality, such as e.g. the display, is broken and need to be replaced by a stand-in device, or that it appears to be broken and that, therefore a test procedure should be initiated. Alternatively, a user may activate the volume up and volume down buttons in a predefined sequence, thereby indicating that a stand-in device for the primary communication device is required. According to another example, a user may apply voice control for instructing the primary communication device that certain functionality is malfunctioning. Any of the suggested instructions, recognized by the primary communication device, may either lead to an unconditional determination by the primary communication device that the instruction is correct, or it may trigger initiation of a suitable testing procedure for allowing the primary communication device to verify that the instruction is indeed correct, before it is determined that the primary device comprise malfunctioning functionality.

When executing an action or test according to any of the embodiments mentioned above, such an action or test may be triggered based on one or more parameters, sensed by the primary communication device 110, where the sensed behavior of these one or more parameters may indicate that the primary communication device 110 has been exposed to a certain event, which has likely resulted in malfunctioning functionality for the primary communication device. Alternatively, or in addition, determining of one or more parameter behaviors and a comparison to respective threshold values may form part of the actual test.

By way of example, by applying a tension force sensor, it can be determined that the primary communication device 110 has experienced a tension of a damaging magnitude. By determining that certain functionality does not consume the expected amount of energy, it is, according to another embodiment, possible to come to the conclusion that this functionality is not operating correctly. Alternatively, an experienced temperature change may indicate that functionality has been damaged by excessive heat, whereas, according to yet another embodiment, an experienced acceleration change, possibly followed by an abruptly ceased acceleration, due to impact of the primary communication device 110 after a fall onto a surface, may be an indication that a communication device has crashed onto a surface. According to yet another example, measurement of moisture in a communication device may give an indication that the device has been exposed to water. By capturing data from a stress sensor, it may, according to yet another embodiment, be determined that the primary communication device 110 has been exposed to stress, which may have been the cause of malfunctioning functionality. In a similar manner, capturing of a force with a force sensor may indicate that the primary communication device 110 has been exposed to a force of a damaging magnitude. Capturing of a specific parametric behavior, as suggested above, may typically be used for triggering a specific process, for manually or automatically testing a specific functionality on the primary communication device 110.

Following the determining that the primary communication device 110 comprises malfunctioning functionality, the primary communication device 110 may, according to another, optional step 2:20, transmit an invitation to one or more potential additional communication devices, herein referred to as secondary communication devices, which are capable of receiving such an invitation and of providing substitute functionality for the primary communication device, i.e. of acting as a stand-in device for the primary communication device 110 with respect to the malfunctioning functionality. The invitation is to be seen as an invitation for another communication device to act as a stand-in device and has the main purpose of making capable communication devices aware of the need for substitute functionality.

The invitation may comprise any type of information which may be useful for the secondary communication device 120 when determining if it is capable and/or available to act as a stand-in device for the primary communication device 110, such as e.g. one or more of: an indication of the location of the primary communication device 110 and a level of trust, required by the primary communication device 110. Such information may also, or alternatively, comprise information for enabling identification of the primary communication device, such as e.g. one or more of a unique device identity or device type. The information may also or alternatively comprise an indication of capabilities of the primary communication device. Furthermore, information on the actual malfunctioning functionality, such as e.g. one or more of an error code, identifying the actual type or category of a determined or estimated error or a determined level of urgency. Whereas information on the actual determined or estimated error category may be the outcome of any of the tests suggested above, a level of urgency may be determined e.g. by checking a list of possible errors or categories of errors, where the different errors or categories of errors may have been arranged in a determined order of urgency.

The invitation may be an invitation to any capable communication device, i.e. any communication device capable of receiving and interpreting the invitation. More specifically, such an invitation can be processed and responded to by any communication device which has a relevant app or function activated, or that is able to activate a relevant app or function in response to receiving and recognizing such an invitation.

Alternatively, the invitation is only sent to one or more specific communication devices, which the primary communication device is aware of. In the latter scenario, an invitation may e.g. be sent to certain communication devices, indicated in the address book or social media circles of the primary communication device 110. Irrespective of whether or not an invitation is sent to a limited number of respondents or any respondent that is capable of receiving an invitation, the invitation may comprise a label or other indication, such as e.g. a hashtag, such as e.g. #standindeviceneeded, distributed e.g. via Instagram, thereby providing an indication of the actual requirements to a potential stand-in device.

In another step 2:30, a secondary communication device 120 indicates its availability and capability with an indication, here referred to as an indication of capability, indicating to the primary communication device 110 that it is available for and capable of providing substitute or stand-in functionality to the primary communication device 110. According to a first embodiment, the indication of capability is sent as a response to an invitation, received from the primary communication device, i.e. a secondary communication device 120, which has received an invitation has determined that it will be able to act as a stand-in device with respect to the malfunctioning functionality.

According to another embodiment, the indication of step 2:30 is instead sent on the initiative of the secondary communication device 120. In the latter embodiment, no invitation has been sent from the primary communication device 110. Instead a user of the secondary communication device 120 may have come to the conclusion that some functionality of the primary communication device 110 is malfunctioning, e.g. by noticing a fall and a break of a display operating as a touch screen of the primary communication device 110 and/or the user may have tried to use the primary communication device 110, coming to the conclusion that functionality of the primary communication device is malfunctioning. As a consequence, it is to be understood that step 2:10 may alternatively be executed at a later stage than what is shown in FIG. 2, so that e.g. reception of an indication of capability from a secondary communication device 120, may trigger that the primary communication device 110 determines that functionality is in fact malfunctioning, with or without requiring a test procedure to be executed.

Once the primary communication device 110 has received an indication of capability from the secondary communication device 120, the primary communication device 110 will initiate a setting-up of a connection between the two communication devices 110,120, as indicated with step 2:40.

In case a plurality of indications, according to step 2:30 have been received by the primary communication device 110, step 2:40 may also comprise determination of which secondary communication device to select as a stand-in communication device. Such a selection may depend on a number of different criteria, all depending on which selection criteria that is available to the primary communication device 110. The selection criteria may be static, such that e.g. for a specific device it is always the same criteria that is applied, or it may change dynamically, e.g. due to the content of the received indications of capability.

In case no selection is needed, connection set-up can be executed instantly with the first secondary communication device transmitting an indication of capability connecting with the primary communication device. Typically, such a connection set-up will comprise an authorization procedure, which may be executed according to any known authorization process, where a trust is established between the communication devices during connection set-up. Alternatively, a trust may have been established between the communication devices 110, 120 already before the connection set-up. Such predetermined trust may e.g. include trust between devices registered within the same organization or an already established address book or social media relation. Any type of known procedure for establishing a trusted relationship between the two communication devices 110, 120, by exchange of public and private keys, may be applied. Alternatively, the applied app or function may be configured to establish a trusted connection between the two devices, by applying any known procedure for verifying that both devices are mutually trusted devices. If a lower level of trust is sufficient, activation of functionality according to a predetermined pattern, such as e.g. the plugging and unplugging of a charger of one of the devices, as mentioned above, may be interpreted by the other device as an indication for predefined trust between the devices.

As indicated with optional step 2:50, the connection set-up can be followed by a process where one or more optional settings are determined. Such settings may e.g. comprise one or more of selection of connection standard to apply, steps or tests to be executed for determining which functionality of the first communication device that is malfunctioning and/or grade of malfunctioning, or conditions for the stand-in functionality to be used. Alternatively, step 2:50 may form part of the connection set-up, so that connection is not set up until required negotiations on conditions to apply during the upcoming steps has been agreed upon by the involved communication devices. Either step 2:40, step 2:50 or a combination of both steps will also comprise activation of a specific function for enabling the secondary communication device 120 to act as a stand-in device for the primary communication device 110, e.g. for allowing a user to enter data to the secondary communication device 120. In case no options are to be set or negotiated between the two communication devices 110,120, a set of default options are applied for the connection.

Once a connection has been set-up, possibly in combination with deciding on one or more optional settings, applicable for the connection and the two devices, the secondary communication device 120 will recognize a command executed by a user, using the secondary communication device 120 as a stand-in communication device. In case the secondary communication device 120 is to be used as a stand-in device for e.g. a malfunctioning touch screen of the primary communication device 110, a command, entered on the touch screen of a secondary communication device by a user, may therefore be recognized and interpreted as a command to be executed on the primary communication device 110 in step 2:60. In a subsequent step 2:70, the recognized command is transmitted to the primary communication device 110, so that the command can be executed by correctly functioning functionality of the primary communication device 110 in a conventional manner, as indicated with step 2:80, i.e. the primary communication device is executing a procedure in a conventional manner, even though it does not itself have access to all functionality, normally required for executing the mentioned procedure.

A user entering a command on the secondary communication device 120, as suggested above, may render the result of the execution on the malfunctioning, primary communication device 110, if this is possible and desired, as indicated with optional step 2:90. However, if the malfunctioning functionality does not allow a result to be viewed on the primary communication device 110, or if, e.g. for integrity reasons, it is preferred to render the result on the secondary communication device 120, or on a third communication device, such as e.g. XR glasses instead, the result of the executed command may instead be transmitted to the secondary communication device 120, as indicated with optional step 2:100, or the third communication device, so that the result can be rendered to the user via the secondary communication device 120, as indicated with optional step 2:110, or via the third communication device.

The steps, starting at step 2:60, may then be repeated until a desired process has been completely executed or until a recognized command is interpreted as a command to terminate the mentioned process.

Executing the process as disclosed above, involves execution of a method at a communication device, herein referred to as a primary communication device, comprising malfunctioning functionality, which will now be described in further detail with reference to FIG. 3, where, in step 3:10, the communication device determines that it has malfunctioning functionality. The mentioned determining may trigger the primary communication device to transmit an invitation destined for one or more other communication devices, herein referred to as one or more secondary communication devices, as indicated with optional step 3:20. The primary communication device will, as indicated with step 3:30, recognize a message, received from a secondary communication device as an indication of capability, implying that the sender of that indication is capable of acting as a stand-in for the primary communication device with respect to the malfunctioning functionality. The recognized indication of capability may be received as a response to an invitation, sent in step 3:20, or, in case no invitation was ever sent, step 3:30 may instead have been initiated at the secondary communication device by a user, being fully aware of, or suspecting the malfunctioning functionality, e.g. from trying to use the malfunctioning functionality of the primary communication device, or from witnessing an incident with the primary communication device.

As already mentioned with respect to step 2:10 of FIG. 2, also step 3:10 may alternatively be executed at a later stage, such as e.g. after step 3:30, where the recognition of an indication of capability may trigger the primary communication device to determine whether or not it has malfunctioning functionality, possibly also in combination with determining which functionality that is malfunctioning, i.e. to specify which functionality that is correctly operable and which is not.

Once the primary communication device has determined that it comprises malfunctioning functionality and has received an indication of capability, i.e. has become aware of that there is at least one secondary communication device available which can act as a stand-in communication device, the primary communication device will initiate a setting-up of a connection between the two communication devices, as indicated with step 3:40. As already mentioned above, the setting-up step may comprise, or be executed in combination with determining one or more selectable options, to be applied when executing the mentioned method, or options may be selected in a separate step (not shown).

Once a connection has been set-up, which typically will be a trusted connection, with respect to both communication devices, the primary communication device is awaiting the receiving of a first command from the secondary communication device, which is eventually received, as indicated with step 3:50, after which the command is executed by functionality of the primary communication device, as indicated with step 3:60. Unless this is not desired or not even possible, due to malfunctioning functionality of the primary communication device, the result of the executed command is also rendered at the primary communication device, as indicated with optional step 3:70. As indicated with another optional step 3:80, the result of the executed command is transmitted to the secondary communication device, for rendering at the secondary communication device.

As indicated with optional steps 3:70 and 3:80, these steps may be executable only if required and possible. However, even if possible, there may be situations where it is not desired to render content on the malfunctioning, primary communication device. This may be the situation if, e.g. for integrity reasons, the user prefers to render content resulting from executing functionality on behalf of malfunctioning functionality of the primary communication device on a rendering device other than the primary device, such as e.g. a pair of XR glasses. Thereby it is possible to avoid that any unauthorized person will be able to see content, resulting from the mentioned execution.

Unless a command is interpreted as a final command of an initiated process, thereby indicating that the initiated process should terminate, or the user has actively entered a command to terminate an ongoing process, which is determined in step 3:90, the steps starting with step 3:50 are repeated so that upcoming commands can be processed accordingly. However, once a terminating command is identified, the suggested method is terminated and completed.

A method as suggested herein, executed at a stand-in communication device, herein referred to as a secondary communication device, capable of acting as a stand-in device for a primary communication device, will now be described in further detail with reference to FIG. 4.

In a step 4:20, the secondary communication device is transmitting a message to the primary communication device, where the message can be referred to as an indication of capability, indicating to the primary communication device that the secondary communication device is both capable of and available for providing substitute functionality, as a substitute for the malfunctioning functionality of the primary communication device. As mentioned above, this may be done on the initiative of a user of the secondary communication device, e.g. due to that the user has become aware of the malfunctioning functionality, or the indication of capability may be sent as a response to an invitation sent from the primary communication device, requesting for assistance. The latter scenario is indicated by optional step 4:10 in FIG. 4.

Once an indication of capability has been sent to the primary communication device, the secondary communication device awaits an indication that a connection set-up has been initiated by the primary communication device, as indicated with step 4:30. Alternatively, the secondary communication device may receive an indication to terminate the initiated process, if e.g. the primary communication device has decided to select another communication device as a stand-in device. As already mentioned above, the connection-set up may include determination of one or more selectable options to be applied when the secondary communication device is acting as a stand-in device. Typically, such options are available for making the stand-in procedure as smooth and secure as possible, thereby providing for a user to select the most appropriate alternatives under the present circumstances, with respect to issues, such as e.g. which communication protocol, authorization method or rendering method to apply. Step 4:30 will typically, as already mentioned above, also comprise an authorization procedure.

Once the connection set-up procedure has been completed and, thus, the secondary communication device is connected to the primary communication device and is acting as a stand-in device for the primary communication device, it will eventually recognize a command, such as e.g. a touch on a touch screen, or a voice command, as indicated with step 4:40. In a next step 4:50 the recognized command is transmitted to the primary communication device, for conventional processing of the command at the primary communication device.

As indicated with optional steps 4:60 and 4:70, respectively, a result of the processing of the executed command may be received, for rendering that result on the secondary communication device if that is desired. Alternatively, rendering is only done on the primary communication device or at a third device, such as e.g. XR glasses. If the command is a command other than a command to terminate the described process, the ongoing process is repeated from step 4:40, as indicated with step 4:80 for one or more further commands, or the process is terminated, if such a command is recognized.

A primary communication device 110 according to one aspect will now be described in further detail, where the primary communication device 110 is configured to determine that functionality of the primary communication device is malfunctioning and to recognize, at least one indication of capability, where each such indication is received from a secondary communication device 120, where the indication of capability is indicating that the respective secondary communication device 120 is capable of providing substitute functionality in place of the malfunctioning functionality. The primary communication device 110 is also configured to set-up a connection between the primary 110 and the secondary communication device 120 and to execute a command, received from the substitute functionality of the secondary communication device 120.

The primary communication device 110 may also be configured to transmit an invitation to at least one secondary communication device 120, inviting the secondary communication device 120 to provide substitute functionality to the primary communication device 110, wherein the recognized indication is a response to the invitation.

In case an invitation is applied, the primary communication device 110 may be configured to provide such an invitation, inviting any communication device, capable of receiving such an invitation, or to provide an invitation to at least one specific communication device, capable of receiving such an invitation, wherein the recognized message is an invitation to set up a connection between the primary communication device 110 and the secondary communication device 120.

When the primary communication device 110 is determining the malfunctioning functionality, it may, according to one embodiment, be configured to initiate a monitoring function for monitoring at least a part of the functionality of the primary communication device, and to determine that at least one part of the monitored functionality is malfunctioning, in case it has been determined that certain functionality cannot be executed in an expected manner by the monitoring functionality.

According to another embodiment, the primary communication device 110 may be configured to determine the malfunctioning functionality by recognizing a predetermined user interaction executed on functionality of the primary communication device 110, according to a predetermined pattern, and by interpreting the result of the recognized user interaction as an indication of malfunctioning functionality of the primary communication device 110, in case an expected result of the predetermined pattern cannot be recognized.

According to yet another embodiment, the primary communication device 110 may be configured so that it is determining the malfunctioning functionality by recognizing an input to certain functionality of the primary communication device 110, by starting a timer, and by determining that at least a part of the functionality of the primary communication device 110 is malfunctioning, in case no response to the request has been recognized when time-out of the timer is determined.

According to another embodiment, the primary communication device 110 is configured such that the determining of the malfunctioning functionality is executed by recognizing an indication, indicating that substitute functionality is required for the primary communication device 110, wherein the indication is initiated by any of: functioning functionality of the primary communication device and a secondary communication device 120, connected with the primary communication device 110 via the established connection.

According to an alternative embodiment, the primary communication device 110 is instead configured such that the determining of the malfunctioning functionality comprises determining, based on at least one parameter sensed by the primary communication device 110, that the functionality of the primary communication device 110 has experienced at least one of: tension, temperature change, acceleration change, moisture, stress, and force.

The primary communication device 110 may be configured to set up a connection which is trusted by both the primary communication device 110 and the secondary communication device 120 before connection set-up, or a connection where a trust is established between the primary communication device 110 and the secondary communication device 120 during the connection set-up. Furthermore, the primary communication device 110 may be configured to determine one or both of which interface to apply for the connection between the primary communication device 110 and the secondary communication device 120, and which UI to use as substitute UI, either in association with setting-up the connection, or as a separate step. The primary communication device 110 may be configured to apply an interface which is based on any of wired transmission, radio transmission, vibrations, sound, NFC or light.

The primary communication device 110 may be configured to identify malfunctioning functionality of a number of different categories, such as e.g. a malfunctioning UI, microphone, speaker or XR glasses.

The primary communication device 110 may be configured to specify to the secondary communication device 120 which functionality that is malfunctioning, where such a specification may comprise options available for the secondary communication device 120 when providing substitute functionality.

The primary communication device 110 may be configured to render the result of an execution of a command or to transmit the result of the execution of the command to the secondary communication device 120 wherein the primary communication device 110 may be prevented from rendering the result on the primary communication device 110.

The primary communication device 110 may be configured to select one secondary communication device 120, from a plurality of communication devices, capable of providing substitute functionality for the malfunctioning functionality, from which the primary communication device 110 has received a respective indication of capability.

Figure 6:
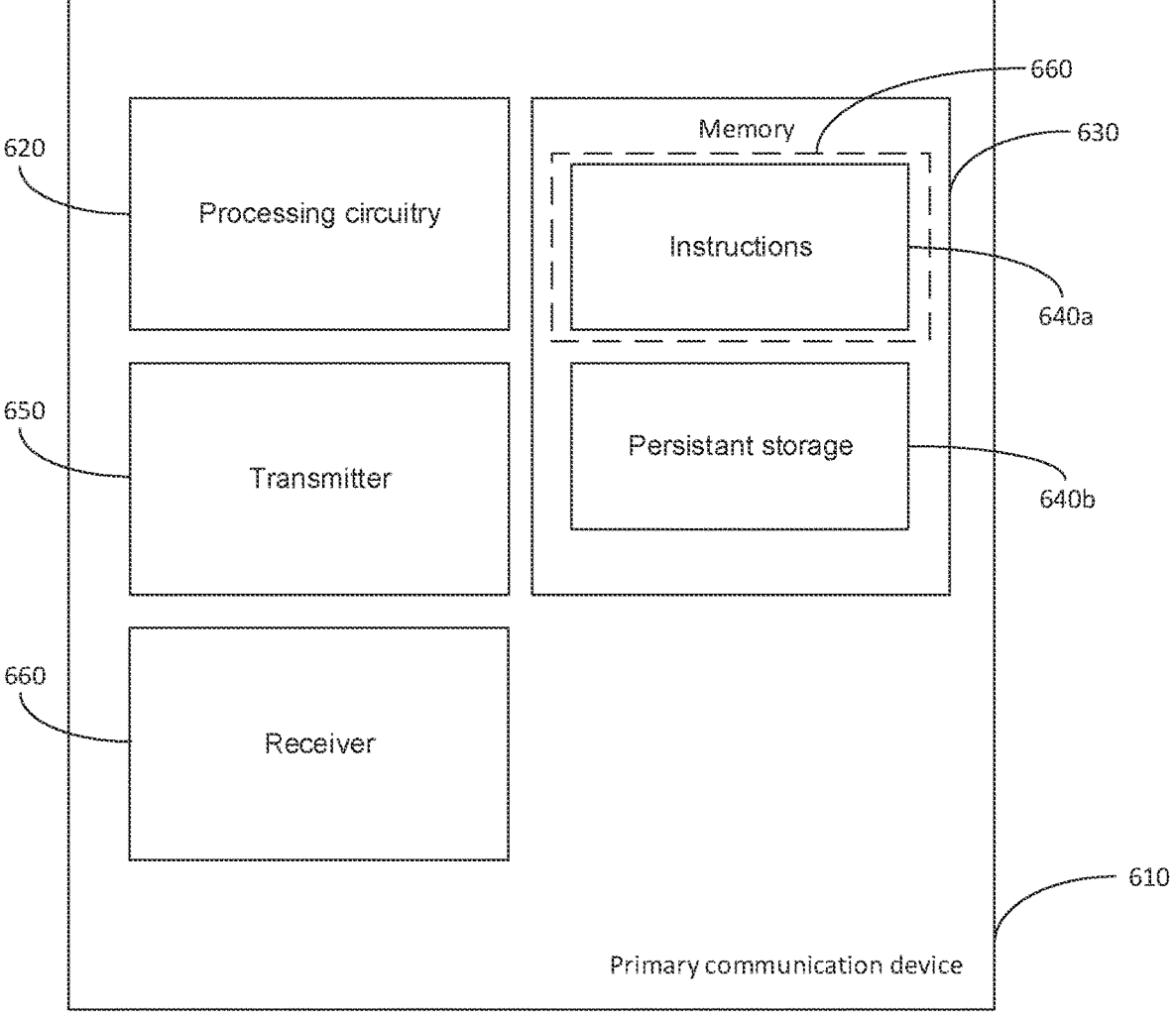
FIG. 6 is a block scheme, illustrating a malfunctioning communication device, according to a second embodiment.

A primary communication device which, according to one aspect, may be provided comprise a plurality of interacting units or modules, capable of executing functionality according to one or more of the embodiments described above when handling malfunctioning functionality, as illustrated in FIG. 6. The modules may be implemented using software instructions. Alternatively, or additionally, the modules are implemented using hardware, such as any one or more of an ASIC Application Specific Integrated Circuit (ASIC), a Field Programmable Gate Array (FPGA), or discrete logical circuits.

Figure 3:
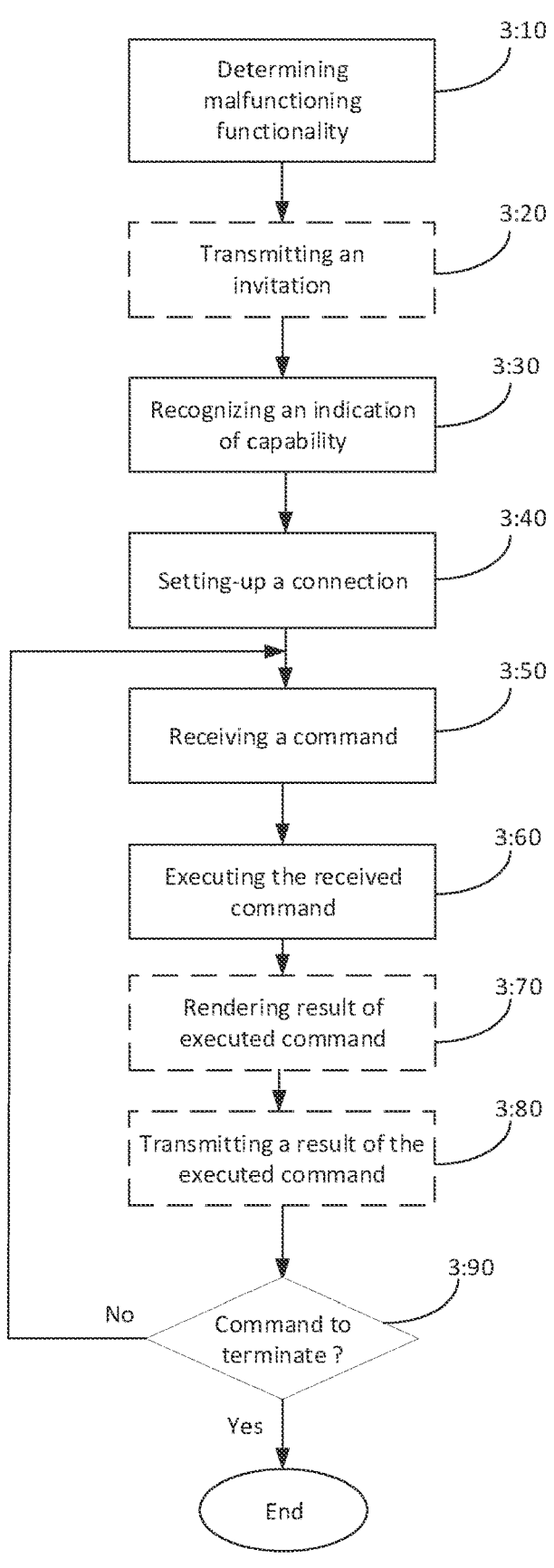
FIG. 3 is a flow chart, illustrating a method executable in a malfunctioning communication device, for setting-up a connection and using the connection for exchanging data.

More specifically, primary communication device 510 comprise a determining unit 520, which is capable of executing functionality corresponding to step 3:10 of FIG. 3, a recognizing unit. 530, capable of executing functionality corresponding to step 3:30 of FIG. 3; an access unit 540, capable of executing functionality corresponding to step 3:40 of FIG. 3; a receiving unit 550, capable of executing functionality corresponding to step 3:50 of FIG. 3; an executing unit 560, capable of executing functionality corresponding to step 3:60. A transmitting unit 570, is capable of executing functionality corresponding to optional steps 3:20 and 3:80 of FIG. 3, whereas a UI 580 is capable of executing functionality, corresponding to optional step 3:70 of FIG. 3. Optionally, the primary communication device 510 may also comprise an optional monitoring unit 590a, for monitoring functionality of the primary communication device 510, as suggested herein, and/or an optional timer unit 590b, for applying a timer as suggested herein.

According to another aspect, a primary communication device 610, which will now be described with reference to FIG. 6, comprise processing circuitry 620, comprising one or more processors, connected to a memory 630, comprising memory areas, storing computer readable instructions 640a that, when executed by the processing circuitry 620 causes the primary communication device 610 to execute tasks, as specified herein.

The memory 630 can be any combination of random access memory (RAM) and/or read only memory (ROM). The memory 630 also comprises persistent storage 640b, which, for example, can be any single one or combination of magnetic memory, optical memory, solid-state memory or even remotely mounted memory. The processing circuitry 620 may comprise e.g. one or more central processing unit (CPU), multiprocessor or digital signal processor (DSP). The primary communication device 610 also comprise transmitting and receiving functionality, here represented by transmitter 650 and receiver 660, for enabling communication with secondary communication devices 120, 720, 820.

Figure 5:
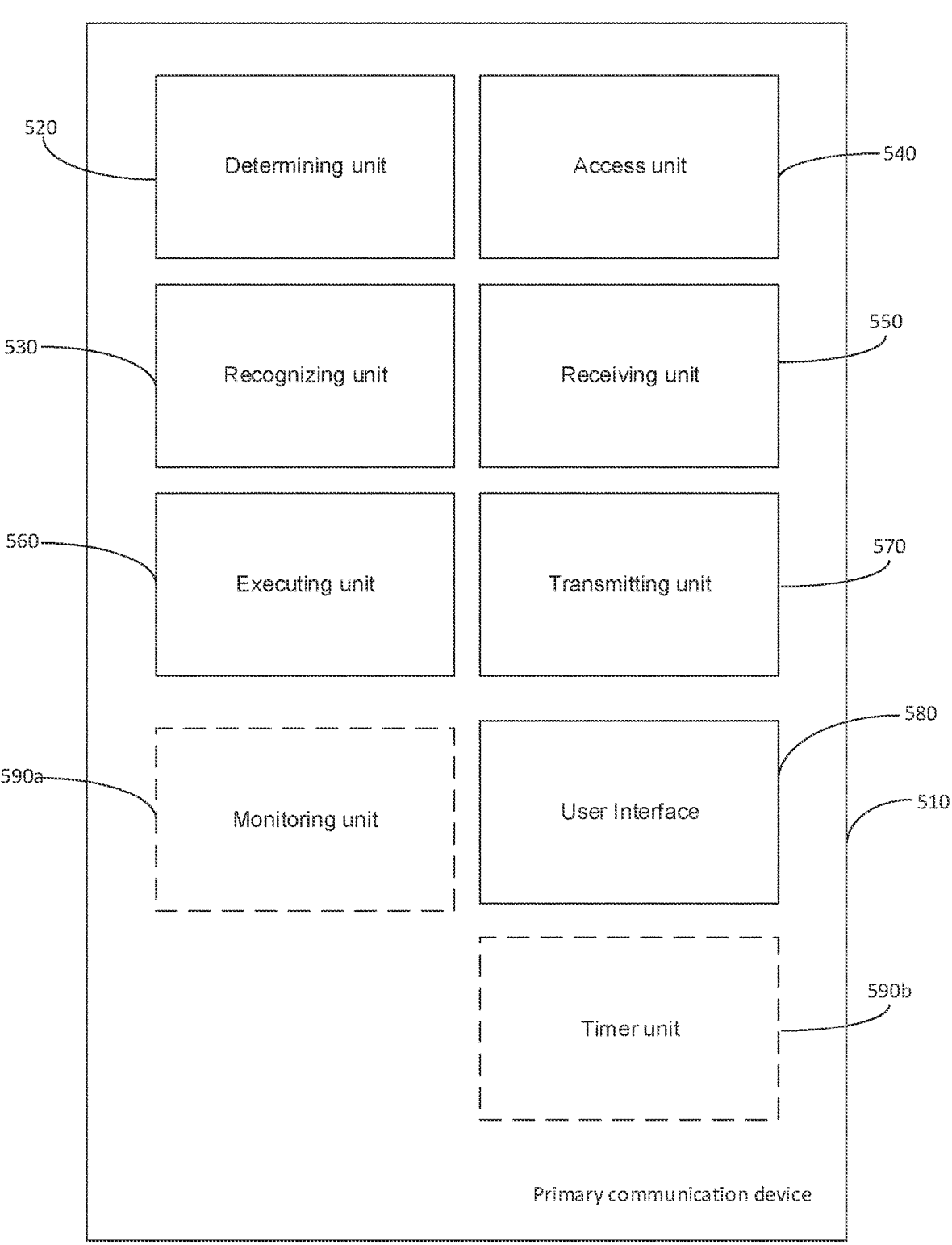
FIG. 5 is a block scheme, illustrating a malfunctioning communication device, according to a first embodiment.

More specifically, the primary communication device 610 is caused to determine that functionality of the primary communication device 610 is malfunctioning and to recognize at least one indication, where each such indication is received from a secondary communication device 120, 720, 820, indicating that the respective secondary communication device 120, 720,820 is capable of providing substitute functionality for the malfunctioning functionality. The primary communication device 610 is also caused to set-up a connection between the primary 610 and the secondary communication device 120, 720, 820, and to execute a command, received from the substitute functionality of the secondary communication device 120, 720,820. Furthermore, the primary communication device 610 may, according to alternative embodiments, be caused to execute functional steps corresponding to the functional steps, executable by the primary communication device 610 according to the first aspect, described above, with reference to FIG. 5.

The computer readable instructions, configured to provide the functionality as described herein may be provided as a computer program, in the form of a computer program product 660, where the computer program product may be e.g. an optical disc, such as a Compact Disc (CD), a Digital Versatile Disc (DVD) or a Blu-Ray disc.

A secondary communication device 120, will now be described in further detail, where the secondary communication device 120 is configured to transmit a message, constituting an indication of capability, to a primary communication device 110, thereby offering substitute functionality, in place of malfunctioning functionality of the primary communication device 110, after which it is participating in a connection set-up between the primary communication device 110 and the secondary communication device 120, in case it has received an indication of an initiated connection set-up from the primary communication device 110. The secondary communication device 120 is also configured to recognize a command, associated with the substitute functionality of the secondary communication device 120, and to transmit the recognized command to the primary communication device 110.

According to one embodiment, the secondary communication device 120 is configured to receive an invitation from the primary communication device 110, where the invitation is inviting at least one communication device capable of providing substitute functionality for the malfunctioning functionality, to provide such functionality, wherein the transmitted indication of capability, is a response to the invitation, where the invitation may be a separate invitation or it may form part of a request for the connection set-up.

The primary communication device 110 may be configured to identify various information, provided in an invitation, where such an invitation may comprise one or more of: information, specifying, to the secondary communication device 120, which functionality that is malfunctioning; an indication of the location of the primary communication device 110; the level of trust, required by the primary communication device 110 and information for enabling identification of the primary communication device 110, and an indication of capabilities of the primary communication device 110.

According to one embodiment, the secondary communication device 120 is configured to make one or more selections, for how functionality is to be provided to the primary communication device 110, where such selections may comprise selecting one or more of: an interface to apply for the connection between the primary communication device 110 and the secondary communication device 120; a standard to apply for the connection-set-up, and a UI to provide as substitute functionality by the secondary communication device 120.

According to one embodiment the mentioned selecting is preceded by determining at least one of a distinguishing feature and a code of the primary communication device 110, wherein the selecting is applied during, or subsequent to, the connection set-up, based on at least one of the distinguishing feature and the code.

The secondary communication device 120 may be configured to apply one of a plurality of possible interfaces, such as e.g. an interface based on any of: wired transmission; radio transmission; vibrations; sound; NFC, and light.

The secondary communication device 120 is, configured to provide various types of substitute functionality wherein such substitute functionality may comprise e.g. at least one of UI functionality and extended reality, XR, glasses functionality.

The secondary communication device 120 is further configured to transmit at least one instruction to the primary communication device 110, where such an instruction is instructing the primary communication device 110 to execute at least one of: initiating a procedure for determining which specific functionality of the primary communication device 110 that is malfunctioning and initiating a procedure for selecting at least one selectable option to be applied by the primary communication device 110 during, or sub-sequent to the connection set-up.

According to another embodiment, the secondary communication device 120 is configured to receive a result of a command, previously transmitted to the primary communication device 110, and to render the result on a graphical user interface, GUI, of the secondary communication device 120.

Figure 7:
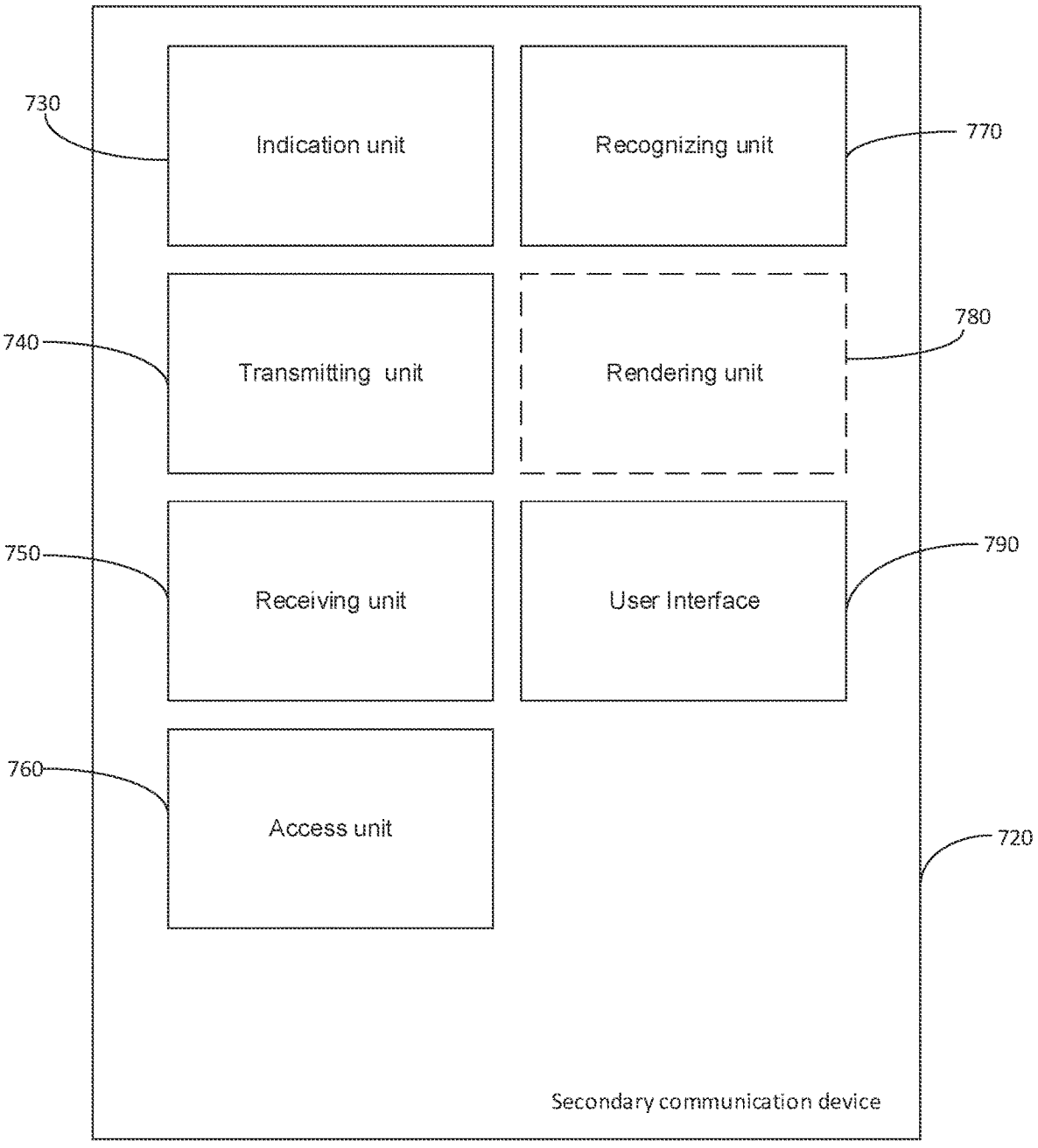
FIG. 7 is a block scheme, illustrating a communication device, acting as a stand-in communication device, according to a first embodiment.

According to one aspect, presented below with reference to FIG. 7, a secondary communication device 720, comprise a plurality of interacting units or modules, capable of executing functionality according to any of the embodiments mentioned above, where the modules may be implemented using software instructions. Alternatively or additionally, the modules are implemented using hardware, such as any one or more of an ASIC Application Specific Integrated Circuit (ASIC), an Field Programmable Gate Array (FPGA), or discrete logical circuits.

Figure 4:
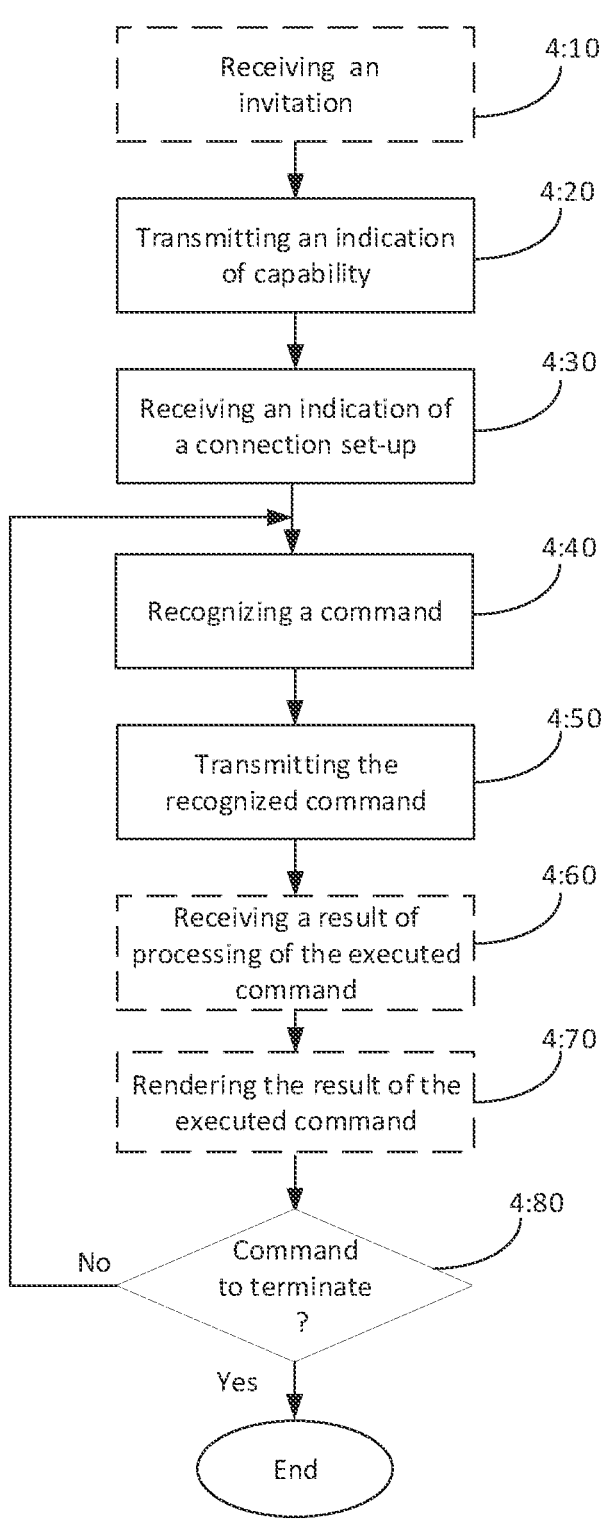
FIG. 4 is a flow chart, illustrating another method, executed in a communication device, acting as a stand-in device, for setting-up a connection and using the connection for exchanging data.

Secondary communication device 720 comprise an indication unit 730, which is able to execute functionality corresponding to 4:20 of FIG. 4, via a transmitting unit 740. The secondary communication device 720 also comprise a receiving unit 750, via which an optional invitation may be received, corresponding to step 4:10 of FIG. 4. The secondary communication device 720 also comprises an access unit 760, capable of executing functionality corresponding to step 4:30 of FIG. 4, a recognizing unit 770, capable of executing functionality corresponding to step 4:40 of FIG. 4, and may also comprise a rendering unit 780, capable of rendering a result of a command, executed at a primary communication device 110, after having been received by the receiving unit 750. The secondary communication device 720 also comprises a UI 790, configured to enable a user to e.g. enter commands.

Figure 8:
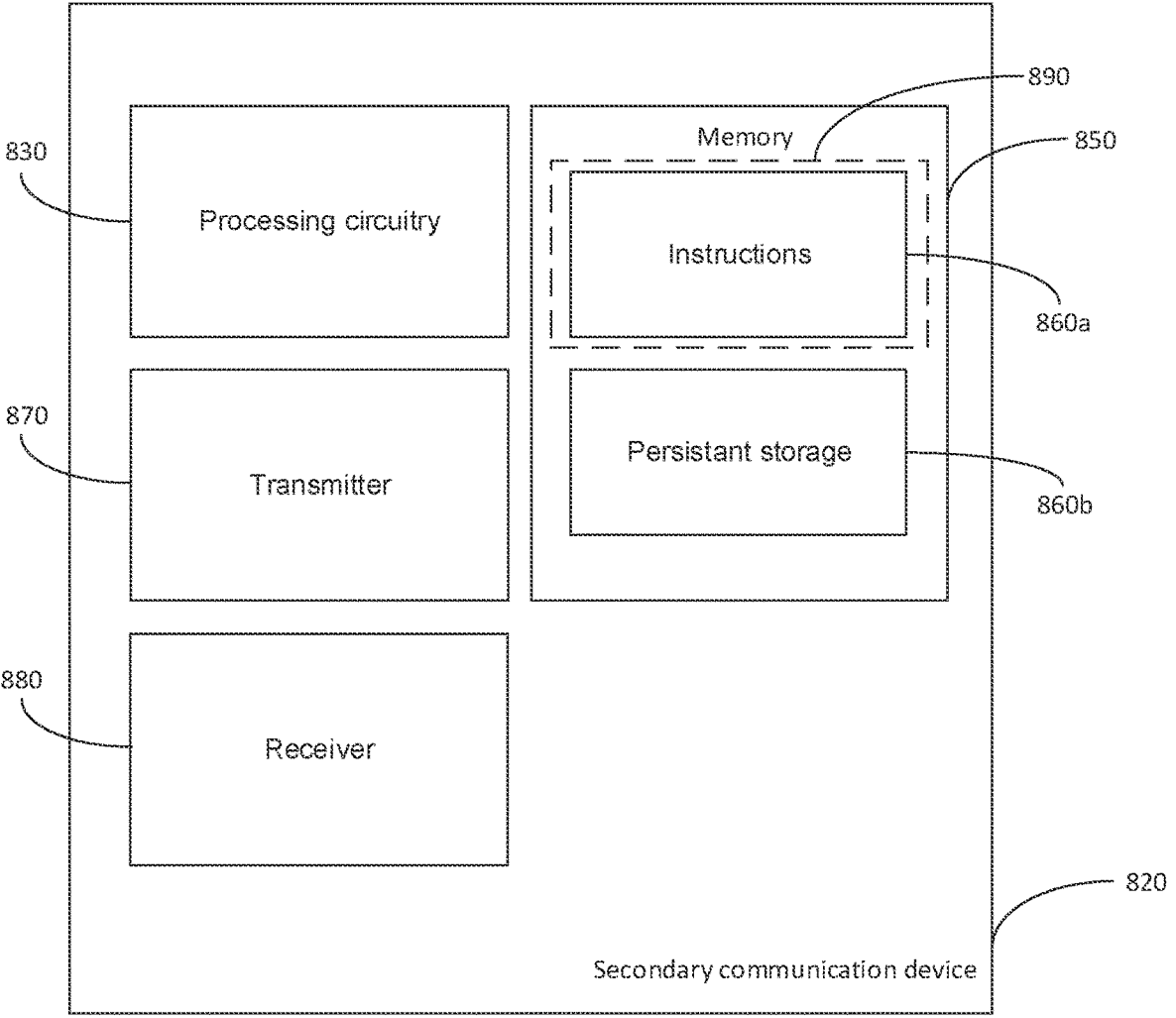
FIG. 8 is a block scheme, illustrating a communication device, acting as a stand-in communication device, according to a second embodiment.

According to another aspect, a secondary communication device 820, which will now be described with reference to FIG. 8, comprise processing circuitry 830, comprising one or more processors, connected to a memory 850, comprising memory areas, storing computer readable instructions 860a that, when executed by the processing circuitry 830 causes the secondary communication device 820 to execute tasks, as specified herein. The memory 850 can be any combination of random access memory (RAM) and/or read only memory (ROM). The memory 850 also comprises persistent storage 860b, which, for example, can be any single one or combination of magnetic memory, optical memory, solid-state memory or even remotely mounted memory. The processing circuitry 830 may comprise e.g. one or more central processing unit (CPU), multiprocessor or digital signal processor (DSP). The secondary communication device 820 also comprise transmitting and receiving functionality, here represented by transmitter 870 and receiver 880, for enabling communication with primary communication devices 610, 620.

More specifically, the secondary communication device 820 is caused to transmit a message, constituting an indication of capability, to the primary communication device 610, 620, offering substitute functionality, substituting malfunctioning functionality of the primary communication device 610, 620; to participate in a connection set-up between the primary communication device 610, 620 and the secondary communication device 820, in response to receiving an indication of an initiated connection set-up from the primary communication device 610, 620; to recognize a command, associated with the substitute functionality of the secondary communication device 820, and to transmit the recognized command to the primary communication device 610,620.

The computer readable instructions 860a, configured to provide the functionality as described herein may be provided as a computer program, in the form of a computer program product 890, where the computer program product may be e.g. an optical disc, such as a Compact Disc (CD), a Digital Versatile Disc (DVD) or a Blu-Ray disc.

The invention claimed is:

1. A method for providing information exchange between a primary communication device and a secondary communication device, the method, being executed in the primary communication device, comprising:

determining that functionality of the primary communication device is malfunctioning;

transmitting an invitation to the secondary communication device, inviting the secondary communication device to provide substitute functionality to the primary communication device;

responsive to transmitting the invitation, recognizing at least one indication of capability, each being received from the secondary communication device, indicating that the respective secondary communication device is capable of providing substitute functionality for the malfunctioning functionality;

setting up a connection between the primary and the secondary communication device, and executing a command, received from the substitute functionality of the secondary communication device.

2. A method for providing information exchange between a primary communication device and a secondary communication device, the method, being executed in the secondary communication device, comprising:

receiving an invitation from the primary communication device, inviting the secondary communication device to provide substitute functionality to the primary communication device;

responsive to receiving the invitation, transmitting an indication of capability to the primary communication device, offering substitute functionality, substituting malfunctioning functionality of the primary communication device;

participating in a connection set-up between the primary communication device and the secondary communication device, in response to receiving an indication of an initiated connection set-up from the primary communication device;

recognizing, a command, associated with the substitute functionality of secondary communication device, and transmitting the recognized command to the primary communication device.

3. A primary communication device capable of exchanging information with a secondary communication device, the primary communication device comprising:

processing circuitry;

memory coupled with the processing circuitry, wherein the memory includes instructions that when executed by the processing circuitry causes the primary communication device to perform operations comprising:

determine that functionality of the primary communication device is malfunctioning;

transmit an invitation to the secondary communication device, inviting the secondary communication device to provide substitute functionality to the primary communication device;

responsive to transmitting the invitation, recognize at least one indication of capability, each being received from a secondary communication device, indicating that the respective secondary communication device is capable of providing substitute functionality for the malfunctioning functionality;

set-up a connection between the primary and the secondary communication device, and execute a command, received from the substitute functionality of the secondary communication device.

4. The primary communication device, according to claim 3, wherein the invitation comprising at least one of:

an invitation, inviting any communication device, capable of receiving such an invitation, and an invitation, inviting at least one specific communication device, capable of receiving such an invitation.

5. The primary communication device, according to claim 3, wherein the primary communication device is configured to interpret the recognized indication of capability as an invitation to set up a connection between the primary communication device and the secondary communication device.

6. The primary communication device, according to claim 3, wherein the primary communication device is configured to determine the malfunctioning functionality by:

initiating a monitoring function for monitoring at least a part of the functionality of the primary communication device, and determining that at least one part of the monitored functionality is malfunctioning in case certain functionality cannot be executed in an expected manner by the monitoring functionality.

7. The primary communication device, according to claim 3, wherein the primary communication device is configured to determine malfunctioning functionality by:

recognizing a predetermined user interaction executed on functionality of the primary communication device according to a predetermined pattern, and interpreting the result of the recognized user interaction as an indication of malfunctioning functionality of the primary communication device in case an expected result of the predetermined pattern cannot be recognized.

8. The primary communication device according to claim 3, wherein the primary communication device is configured to determine the malfunctioning functionality by:

recognizing an input to certain functionality of the primary communication device;

starting a timer, and determining that at least a part of the functionality of the primary communication device is malfunctioning in case no response to a request has been recognized upon time-out of the timer.

9. The primary communication device according to claim 3, wherein the primary communication device is configured to determine the malfunctioning functionality by recognizing an indication, indicating that substitute functionality is required for the primary communication device, wherein the indication is initiated by any of: functioning functionality of the primary communication device, and a secondary communication device, connected with the primary communication device via the established connection.

10. The primary communication device according to claim 3, wherein the primary communication device is configured to set-up the connection by determining at least one of:

which interface to apply for the connection between the primary communication device and the secondary communication device, and which user interface (UI) to use as substitute UI.

11. The primary communication device according to claim 3, wherein the primary communication device is further configured to specify, to the secondary communication device, which functionality that is malfunctioning.

12. The primary communication device according to claim 3, wherein the primary communication device is further configured to transmit a result of the execution of the command to the secondary communication device wherein the primary communication device is prevented from rendering the result on the primary communication device.

13. A secondary communication device capable of exchanging information with a primary communication device, the secondary communication device comprising:

processing circuitry;

memory coupled with the processing circuitry, wherein the memory includes instructions that when executed by the processing circuitry causes the secondary communication device to perform operations comprising:

receive an invitation from the primary communication device, inviting the secondary communication device to provide substitute functionality to the primary communication device;

responsive to receiving the invitation, transmit an indication of capability to the primary communication device, offering substitute functionality, substituting malfunctioning functionality of the primary communication device;

participate in a connection set-up between the primary communication device and the secondary communication device, in response to receiving an indication of an initiated connection set-up from the primary communication device;

recognize a command, associated with the substitute functionality of secondary communication device, and transmit the recognized command to the primary communication device.

14. The secondary communication device according to claim 13, wherein the memory includes instructions that when executed by the processing circuitry causes the secondary communication device to perform further operations comprising interpret an invitation which further comprises information, specifying to the secondary communication device, one or more of:

which functionality that is malfunctioning at the primary communication device;

the location of the primary communication device;

the level of trust, required by the primary communication device;

the capabilities of the primary communication device, and information for enabling identification of the primary communication device.

15. The secondary communication device according to claim 13, wherein the memory includes instructions that when executed by the processing circuitry causes the secondary communication device to perform further operations comprising select at least one of:

an interface to apply for the connection between the primary communication device and the secondary communication device;

a standard to apply for the connection-set-up, and a UI to provide as substitute functionality by the secondary communication device.

16. The secondary communication device according to claim 15, wherein the memory includes instructions that when executed by the processing circuitry causes the secondary communication device to perform further operations comprising:

determine at least one of a distinguishing feature and a code of the primary communication device, wherein the selecting is applied during, or subsequent to, the connection set-up, based on at least one of the distinguishing feature and the code.

17. The secondary communication device according to claim 13, wherein the memory includes instructions that when executed by the processing circuitry causes the secondary communication device to perform further operations comprising transmit at least one instruction to the primary communication device, instructing it to execute:

initiating a procedure for selecting at least one selectable option to be applied by the primary communication device during, or sub-sequent to the connection set-up.

18. The secondary communication device according to claim 13, wherein the memory includes instructions that when executed by the processing circuitry causes the secondary communication device to perform further operations comprising receive a result of the command, transmitted to the primary communication device, and render the result on a graphical user interface, GUI, of the secondary communication device.

19. The secondary communication device according to claim 13, wherein the memory includes instructions that when executed by the processing circuitry causes the secondary communication device to perform further operations comprising transmit at least one instruction to the primary communication device, instructing it to execute:

initiating a procedure for determining which specific functionality of the primary communication device that is malfunctioning.

* * * * *